US010202965B2

(12) United States Patent
Bertolotti et al.

(10) Patent No.: US 10,202,965 B2
(45) Date of Patent: Feb. 12, 2019

(54) METHOD AND SYSTEM FOR ESTIMATING THE SURFACE CONDITION OF A ROTATING BLADE

(71) Applicant: SSB Wind Systems GmbH & Co. KG, Salzbergen (DE)

(72) Inventors: Fabio Bertolotti, Bad Bentheim (DE); Jens Van Schelve, Bremen (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 99 days.

(21) Appl. No.: 15/235,552

(22) Filed: Aug. 12, 2016

(65) Prior Publication Data

US 2017/0058870 A1 Mar. 2, 2017

(30) Foreign Application Priority Data

Sep. 1, 2015 (EP) .................................... 15183407

(51) Int. Cl.
*F03D 17/00* (2016.01)
*F03D 80/50* (2016.01)
(Continued)

(52) U.S. Cl.
CPC .......... *F03D 17/00* (2016.05); *F03D 7/0224* (2013.01); *F03D 80/50* (2016.05); *G01M 15/14* (2013.01)

(58) Field of Classification Search
CPC ....................................................... F03D 17/00
See application file for complete search history.

(56) References Cited

U.S. PATENT DOCUMENTS

2011/0150649 A1 6/2011 White et al.
2014/0241878 A1* 8/2014 Herrig .................. F03D 7/0224
416/1
(Continued)

FOREIGN PATENT DOCUMENTS

EP 2772643 A2 9/2014
EP 2818698 A1 12/2014
(Continued)

OTHER PUBLICATIONS

European Search Report for corresponding European Patent Application EP 15 18 3407 dated Feb. 10, 2016, 5 pages.
(Continued)

*Primary Examiner* — Manuel A Rivera Vargas
(74) *Attorney, Agent, or Firm* — Harness, Dickey & Pierce, P.L.C.

(57) ABSTRACT

A method is disclosed for estimating the surface condition of a blade rotating about a rotational axis in an air or fluid stream. The method involves measuring blade deformations indicative of blade loads acting on the blade to identify actual blade loads (P,R,T), measuring blade-state information ($\Psi, \Omega, \rho, V$) indicative of a blade operational state to identify a given blade operational state ($\alpha, Q$), providing a clean-surface aerodynamic map ($\mathcal{M}_c$) relating blade loads to an ensemble of blade operational states when the blade surface is in a clean state, providing a dirty-surface aerodynamic map ($\mathcal{M}_d$) relating blade loads to an ensemble of blade operational states when the blade surface is in a dirty state, estimating the surface condition of the blade by comparing the distance of the actual blade loads (P,R,T) to the blade loads given by the clean-surface aerodynamic map ($\mathcal{M}_c$) at the given operational state ($\alpha, Q$), and the distance of the actual blade loads (P,R,T) to the blade loads given by (Continued)

the dirty-surface aerodynamic map ($\mathcal{M}_c$) at the given operational state ($\alpha$,Q).

14 Claims, 4 Drawing Sheets (51) Int. Cl.
*F03D 7/02* (2006.01)
*G01M 15/14* (2006.01)

(56) References Cited

U.S. PATENT DOCUMENTS

2015/0198141 A1* 7/2015 Hayden .................. F03D 1/0675
    416/1
2015/0354402 A1* 12/2015 Ehsani ................... F03D 17/00
    290/44

FOREIGN PATENT DOCUMENTS

| EP | 2840258 A1 | 2/2015 |
|---|---|---|
| WO | 2008020242 A2 | 2/2008 |
| WO | 2011051194 A1 | 5/2011 |

OTHER PUBLICATIONS

Fingersh, L. J. "Optical Blade Position Tracking System Test," Technical Report NREL/TP-500-39253, Jan. 2006, 10 pages.

* cited by examiner

METHOD AND SYSTEM FOR ESTIMATING THE SURFACE CONDITION OF A ROTATING BLADE

CROSS-REFERENCE TO RELATED APPLICATIONS

This application claims the benefit and priority to European Patent Application No. EP151834074 filed Aug. 1, 2015. The entire disclosure of the above application is incorporated herein by reference.

FIELD

The invention relates to a method for estimating the surface condition of a blade rotating about a rotational axis in an air or fluid stream. Further, the invention relates to a blade surface-condition measuring system for a device having a blade rotating about a rotational axis in an air or fluid stream.

BACKGROUND

Modern wind turbines of multi-Megawatt class have wind turbine blades that are aerodynamically optimized for high efficiency. Maintaining high efficiency is central to the profitability of wind turbine operation, since competition amongst electrical power producers has brought the profit margins down into single digits, in percent, and changes in efficiency that might be overlooked by the casual observer are indeed strongly felt in the profit and loss statements.

The control logic for each wind turbine plays a big role in the total energy generated. Another strong influence on efficiency comes from the blade's aerodynamics. The aerodynamics influence the lift force, hence the power producing force, that the blade generates, as well as the drag force that reduces the power generating ability of the turbine.

During operation, the blades move rapidly through the air and are, thereby, subject to the accumulation of dirt or organic material on their surface due to collisions between the blades and particulates (e.g., salt, dirt), or insects in the air.

Blades can be mass produced with a given shape, or can be tailored during design for maximum performance at a given site. In tailoring, the design is adopted to the anticipated blade surface state at the given site, such as very smooth blade surface (without roughness) for a site exposed predominantly to clean air, or with some characteristic roughness for a site exposed to dirt or frequent impacts with insects.

When, during operation, the blade surface deviates from the surface condition assumed during the design process, a detrimental loss of aerodynamic efficiency, and, therefore, produced energy, occurs. It is desirable, therefore, to measure, or assess, the surface condition of the blades at all times to determine the rate of lost energy, hence the rate of lost revenue. Based on this information, the optimum corrective action can be taken, such as, for example, planning a surface cleaning maintenance at the best possible time (a decision that includes comparing the accumulated cost of lost energy production with the cost of a scheduled or an unscheduled maintenance activity).

Additionally to material accumulation on the blade surface, the leading edge of the blade may undergo erosion during operation, due to the accumulated effect of energetic collisions with particulates in the air. Erosion is an extreme case of deterioration of the blade surface condition, characterized by a loss of surface material.

Knowledge of the clean or dirty state of the blade's surface can be used favorably by the turbine operator, by (a) adopting the control strategy to maximize the efficiency with the current clean/dirty state of the blade surface, as discussed in EP 2 818 698 A1, and (b) by scheduling at the best time the blade cleaning, so as to minimize power loss during stand-still.

Maintaining the blades with a clean surface condition, thus, is central to maintaining high wind turbine efficiency. Currently, the surface condition of blades is assessed by simple visual inspection, either by a ground based observer or, less often, by a service person repelling along the blade. This surface inspection is very infrequent, typically occurring during a selected maintenance operation, thereby allowing a wind turbine to operate with dirty blades for extended periods of time before remedial action is taken. Unfortunately, there are no products or systems commercially available today for continuously monitoring a blade surface condition. It is highly desirable, thus, to have a system for assessing the surface condition of the blades that operates continuously, and that can provide a numerical measure of the level of dirtiness, so that both adaptations can be made in the wind turbine control logic, and blade-cleaning scheduling can be optimally planned to minimize lost revenue.

There are numerous products for detecting blade deflections, and blade material strain. For example, National Renewable Energy Labs Technical Report NREL/TP-500-39253 (January 2006) teaches an optical system for measuring blade deflection at selected spanwise locations, while WO 2008/020242 A2 discloses a fiber-optic based system with Bragg gratings for measuring wind turbine material strains, and US 2011/0150649 A1 teaches the use of an accelerometer located in the outward portion of the blade and a procedure to obtain blade deflections from its signal. These systems perform blade-deformation measurements on a continuous basis, without the need of a human-in-the-loop in the process of evaluating the generated signals.

It is further highly desirable to have a system for assessing the surface condition of the blades that uses technology free of human-in-the-loop requirements for signal analysis, hence is able to provide a signal indicative of blade surface condition on a continuous, automatic, basis.

SUMMARY

An important object of the invention is to be able to estimate the surface condition of a blade rotating about a rotational axis in an air or fluid stream.

This object is achieved according to the invention by a method and system as presented herein.

In one aspect, the invention relates to a method for estimating the surface condition of a blade rotating about a rotational axis in an air or fluid stream. The method comprises the steps of:
  measuring blade deformations indicative of blade loads acting on the blade to identify actual blade loads,
  measuring blade-state information indicative of a blade operational state to identify a given blade operational state,
  providing a clean-surface aerodynamic map relating blade loads to an ensemble of blade operational states when the blade surface is in a clean state,
  providing a dirty-surface aerodynamic map relating blade loads to an ensemble of blade operational states when the blade surface is in a dirty state, estimating the surface condition of the blade by comparing the distance of the actual blade loads to the blade loads given by the clean-surface aerodynamic map at the given operational state, and the distance of the actual blade loads to the blade loads given by the dirty-surface aerodynamic map at the given operational state.

Preferably, the blade extends in the direction of a blade axis running transverse or substantially transverse to the rotational axis. For instance, the rotational axis is the rotational axis of a main shaft. In particular, the rotational axis can thus also be referred to as a main-shaft axis. Preferably, the blade is connected to the main shaft. In particular, the blade is rotatable about the blade axis. For instance, the blade is rotatable about the blade axis relative to the main shaft.

According to a preferred embodiment the blade is connected to or forms a part of a rotor rotating about the rotational axis. In particular, the rotational axis can thus also be referred to as a rotor axis. Preferably, the rotor is rigidly connected to the main shaft. Advantageously, the rotor comprises a hub, the blade being connected to the hub. For instance, the blade is rigidly coupled to the hub. Preferably, the blade is rotatable about the blade axis relative to the hub. In particular, the blade is rotatably mounted about the blade axis on the hub (e.g., by means of a pitch bearing). Preferably, the blade extends from the hub in the direction of the blade axis. In particular, the hub is rigidly connected to the main shaft.

Advantageously, the blade is a machine part. In particular, the blade is a blade of a wind power plant or water-power plant. Preferably, the rotor is a machine part. In particular, the rotor is a rotor of a wind power plant or water-power plant. Advantageously, the main shaft is a rotor shaft of the wind power plant or water-power plant. In particular, the wind power plant can also be referred to as a wind turbine.

Preferably, the blade-state information comprises a blade azimuthal angle and/or a blade rotational velocity and/or an air or fluid density and/or an air or fluid velocity. In particular, the blade-state information further comprises a blade pitch angle. Preferably, the blade rotational velocity is identical with the rotor rotational speed (rotor speed). In particular, the blade rotational velocity can thus also be referred to as a rotor speed.

According to a preferred embodiment, the blade deformations are indicative of blade moments about different blade directions defined by the blade geometry. Preferably, the blade geometry defines a blade edgewise direction and a blade flapwise direction, the blade loads are partitioned into edgewise blade loads acting in or about the blade edgewise direction and flapwise blade loads acting in or about the blade flapwise direction. In particular, each distance is composed of an edgewise distance involving edgewise blade loads, and a flapwise distance involving flapwise blade loads.

According to a preferred embodiment, the blade deformations are indicative of blade-root strains and/or blade deflections at selected spanwise locations. In particular, the blade deformations are indicative of blade loads including blade loads in the flapwise and edgewise directions, and preferably including torsional loads.

According to a preferred embodiment the operational state is defined by a dynamic pressure and a representative blade angle of attack, the dynamic pressure and the representative blade angle of attack being derived from the blade-state information.

Preferably, the contribution from gravity and centripetal acceleration to the actual blade loads is removed from the actual blade loads to identify actual purified blade loads. In particular, the contribution from gravity and centripetal acceleration to the actual blade loads is computed, and actual purified blade loads are identified by subtracting this contribution from the actual blade loads.

According to a preferred embodiment the clean aerodynamic map and the dirty aerodynamic map are expressed in terms of purified blade loads, and the surface condition of the blade is estimated on the basis of purified blade loads.

Preferably, the actual purified blade loads are normalized with the dynamic pressure to identify actual normalized purified blade loads, the clean aerodynamic map and the dirty aerodynamic map are expressed in terms of normalized purified blade loads, and the surface condition of the blade is estimated on the basis of normalized purified blade loads.

According to a preferred embodiment each map is created (or built or generated or constructed) by using experimental data and/or a mathematical model of the blade. In particular, each map comprises a table and/or a mathematical function. Preferably, each map is a predetermined map.

According to a preferred embodiment the method further comprises the steps of:
  providing a reference blade,
  creating the clean-surface aerodynamic map for the reference blade when the reference blade surface is in a clean state,
  creating the dirty-surface aerodynamic map for the reference blade when the reference blade surface is in a dirty state.

According to a preferred embodiment the method further comprises the step of:
  producing a signal indicative of the estimated blade surface condition.

The invention furthermore relates to a blade surface-condition measuring system for a device having a blade rotating about a rotational axis in an air or fluid stream. The system comprises:
  a blade-deformation sensing means for measuring blade deformations indicative of blade loads acting on the blade, the blade-deformation sensing means producing signals indicative of actual blade loads,
  a blade-state sensing means for measuring blade-state information indicative of a blade operational state, the blade-state sensing means producing blade-state signals indicative of the blade-state information,
  a first computational unit for identifying a given blade operational state, the first computational unit receiving the blade-state signals and producing signals indicative of the given blade operational state,
  a main computational unit for estimating a surface condition of the blade, the main computational unit receiving the signals indicative of the actual blade loads and the given blade operational state, the main computational unit further having access to
    a clean-surface aerodynamic map relating blade loads to an ensemble of blade operational states when the blade surface is in a clean state, and
    a dirty-surface aerodynamic map relating blade loads to an ensemble of blade operational states when the blade surface is in a dirty state,
  the main computational unit estimating the surface condition of the blade by comparing the distance of the actual blade loads to the blade loads given by the clean-surface aerodynamic map at the given operational state, and the distance of the actual blade loads to the blade loads given by the dirty-surface aerodynamic map at the given operational state, the main computational unit producing a signal indicative of the estimated blade surface condition.

Preferably, the method is applied or performed by means of the blade surface-condition measuring system and/or the blade surface-condition measuring system is used for applying or performing the method. In particular, the blade surface-condition measuring system can be developed according to all modifications discussed in connection with the method and/or the method can be developed according to all modifications discussed in connection with the blade surface-condition measuring system.

Preferably, the blade extends in the direction of a blade axis running transverse or substantially transverse to the rotational axis. For instance, the rotational axis is the rotational axis of a main shaft. In particular, the rotational axis can thus also be referred to as a main-shaft axis. Preferably, the blade is connected to the main shaft. In particular, the blade is rotatable about the blade axis. For instance, the blade is rotatable about the blade axis relative to the main shaft.

According to a preferred embodiment the blade is connected to or forms a part of a rotor rotating about the rotational axis. In particular, the rotational axis can thus also be referred to as a rotor axis. Preferably, the rotor is rigidly connected to the main shaft. Advantageously, the rotor comprises a hub, the blade being connected to the hub. For instance, the blade is rigidly coupled to the hub. Preferably, the blade is rotatable about the blade axis relative to the hub. In particular, the blade is rotatably mounted about the blade axis on the hub (e.g., by means of a pitch bearing). Preferably, the blade extends from the hub in the direction of the blade axis. In particular, the hub is rigidly connected to the main shaft.

Advantageously, the device is or forms a machine or machine part. For instance, the machine is a wind power plant or water-power plant. In particular, the machine comprises the rotor. Preferably, the machine part is a part of a wind power plant or water-power plant. Advantageously, the machine part is or comprises the rotor. In particular, the wind power plant can also be referred to as a wind turbine.

Preferably, the blade-state information comprises a blade azimuthal angle and/or a blade rotational velocity and/or an air or fluid density and/or an air or fluid velocity. In particular, the blade-state information further comprises a blade pitch angle. Preferably, the blade rotational velocity is identical with the rotor rotational speed (rotor speed). In particular, the blade rotational velocity can thus also be referred to as a rotor speed.

According to a preferred embodiment, the blade-state sensing means comprises at least one rotational speed sensor or rotary encoder (e.g., rotor encoder) and/or at least one air or fluid density sensor and/or at least one air or fluid velocity sensor (e.g., wind anemometer) and/or at least one blade pitch sensor or blade pitch measuring unit. Preferably, the blade azimuthal angle and/or the blade rotational velocity are measured by means of the rotational speed sensor or rotary encoder. In particular, the air or fluid density is measured by means of the air or fluid density sensor. Preferably, the air or fluid velocity is measured by means of the air or fluid velocity sensor. In particular, the blade pitch angle is measured by means of the blade pitch sensor or blade pitch measuring unit.

According to a preferred embodiment, the blade deformations measured by the blade-deformation sensing means are indicative of blade moments about different blade directions defined by the blade geometry. Preferably, the blade geometry defines a blade edgewise direction and a blade flapwise direction, the blade loads are partitioned into edgewise blade loads acting in or about the blade edgewise direction and flapwise blade loads acting in or about the blade flapwise direction. In particular, each distance is composed of an edgewise distance involving edgewise blade loads, and a flapwise distance involving flapwise blade loads. Preferably, the blade geometry is designed to produce maximum lift force at minimum drag force.

According to a preferred embodiment the signals produced by the blade-deformation sensing means are indicative of blade-root strains and/or blade deflections at selected spanwise locations. In particular, the signals produced by the blade-deformation sensing means are indicative of blade loads including blade loads in the flapwise and edgewise directions, and preferably including torsional loads. Preferably, the signals produced by the blade-deformation sensing means can also be referred to as blade deformation signals or blade signals.

According to a preferred embodiment, the blade-deformation sensing means comprises at least one blade strain sensor and/or at least one blade deflection sensor. In particular, the blade-deformation sensing means comprises at least one blade strain sensor and/or at least one blade deflection sensor for each blade direction defined by the blade geometry.

According to a preferred embodiment the operational state is defined by a dynamic pressure and a representative blade angle of attack, the signals produced by the first computational unit being indicative of the dynamic pressure and the representative blade angle of attack.

Preferably, the system further comprises a second computational unit for computing the contribution from gravity and centripetal acceleration to the actual blade loads. In particular, the system furthermore comprises a third computational unit for subtracting or removing this contribution from the actual blade loads to produce actual purified blade loads.

According to a preferred embodiment the main computational unit is receiving the actual purified blade loads, wherein the clean aerodynamic map and the dirty aerodynamic map are expressed in terms of purified blade loads, and the main computational unit estimates the surface condition of the blade based on purified blade loads.

Preferably, the systems further comprising a fourth computational unit for producing actual normalized purified blade loads by dividing the actual purified blade loads by the dynamic pressure. In particular, the main computational unit is receiving the actual normalized purified blade loads, wherein the clean aerodynamic map and the dirty aerodynamic map are expressed in terms of normalized purified blade loads, and the main computational unit estimates the surface condition of the blade based on normalized purified blade loads.

DRAWINGS

The drawings described herein are for illustrative purposes only of selected embodiments and not all possible implementations, and are not intended to limit the scope of the present disclosure.

The invention is described in more detail hereinafter with the aid of preferred embodiments and with reference to the accompanying drawings, in which.

DETAILED DESCRIPTION

Example embodiments will now be described more fully with reference to the accompanying drawings.

Part 1: Geometry and Nomenclature

Figure 1:
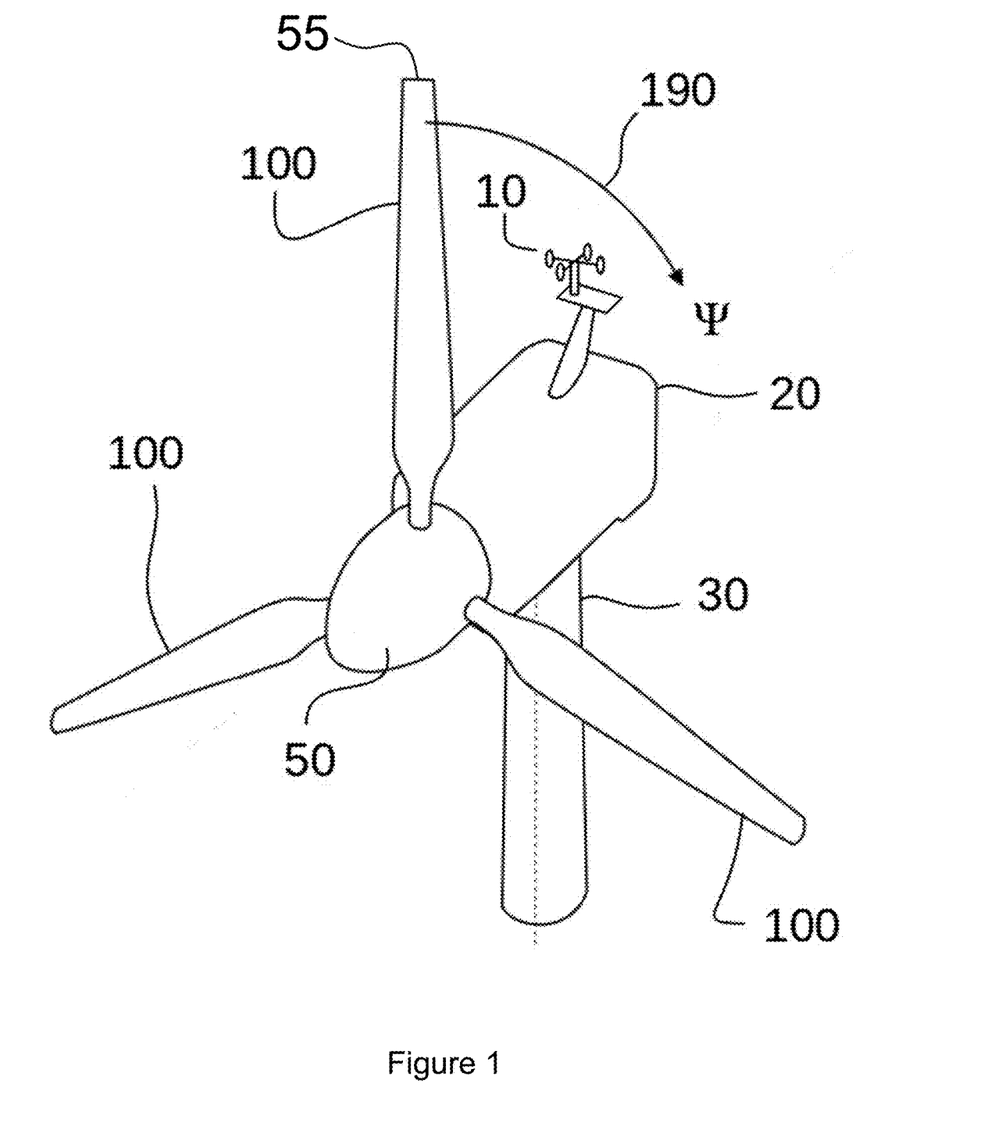
FIG. 1 displays a wind turbine with rotor and rotor blades.
Figure 2:
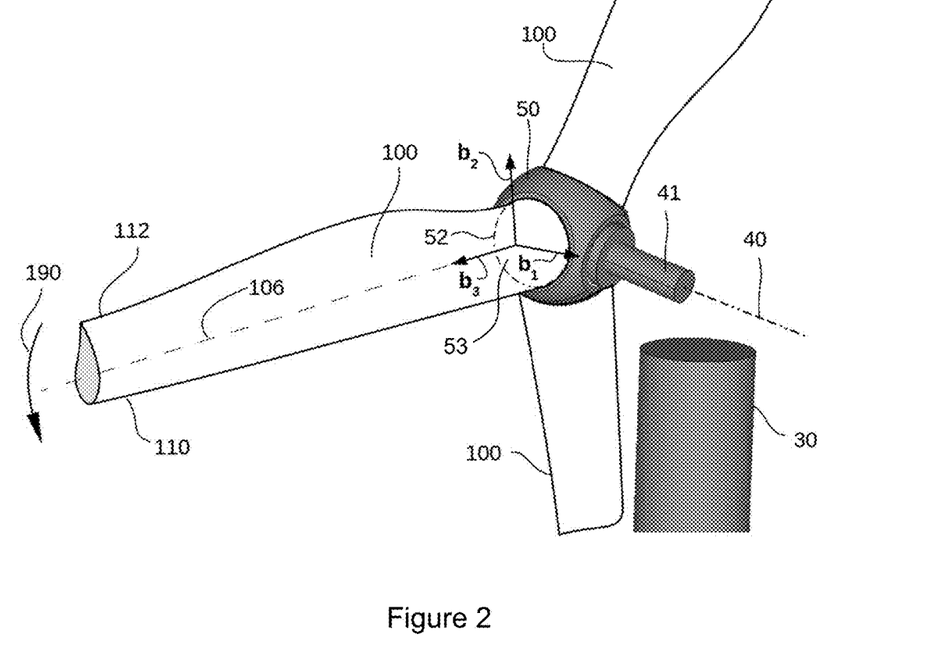
FIG. 2 displays selected components of the wind turbine and rotor blades, and the blade coordinate system attached to one blade, FIG. 3 displays exemplary variations of the normalized flapwise and edgewise blade loads versus representative blade angle of attack, for blades with clean and dirty surface conditions, FIG. 4 displays the components of an embodiment of the invention, and associated flow of measured and computed signals, and FIG. 5 displays an example of a coefficient of performance versus tip speed ratio for blades with clean and dirty surface conditions.

In reference to FIGS. 1 and 2, the wind turbine is composed of a tower 30, a nacelle 20 attached to the tower 30, and rotating about a rotational axis 40 of a main shaft 41 rotationally attached to the nacelle, a hub 50 attached to the main shaft 41, and two or more blades 100 attached to the hub 50.

Each blade 100 is attached to the hub 50 at the blade root, and is either connected to the hub directly, or to a pitch bearing 52 connecting the blade root to the hub 50, and allowing rotational motion of the blade root relative to the hub 50. The blade root and the bearing 52 (or hub flange if the bearing is absent) lie in a common plane, which we denote as a blade-root plane 53. The axis normal to the blade-root plane 53 defines a blade axis 106. Furthermore, as the hub 50, and blade 100, rotates about the main-shaft rotational axis 40, as indicated by directional arrow 190, the blade tip 55 trace an imaginary circle in space that defines a rotor plane, having a rotor-plane normal direction.

As is well known in the art, a pitch angle is the angle between the chord-line of the blade profile at some outward station near the blade tip (e.g., at 75% span), and the rotor plane. When the wind turbine is operating at maximum aerodynamic efficiency, whereby the most kinetic energy from the impinging wind is extracted, the blades have an optimal rotational orientation about the blade axis 106 with respect to the hub 50, and with respect to the rotor plane. This optimal rotational orientation defines a "zero-pitch-angle" orientation. Typically, the value of the "zero-pith-angle" orientation is either zero, or a value near zero.

When the pitch bearing 52 allows the blade to rotate about the blade axis 106, the blade pitch angle is variable, and is commanded during operation to control the amount of energy extracted from the wind. In particular, when the turbine operates at maximum aerodynamic efficiency, there is a rated wind speed at which the energy extracted from the wind matches the maximum energy that can be produced by the electrical generator. Above the rated wind speed, pitching is activated to reduce the aerodynamic efficiency and extract only as much power as the generator can handle.

The blade pitch axis 106 and the "zero-pitch-angle" orientation define a blade-coordinate system, denoted by $\{b_1, b_2, b_3\}$, and shown in FIG. 2, having the $b_3$ direction along the blade axis 106, the $b_1$ parallel to the rotor-plane-normal direction when the blade is in the "zero-pitch-angle" orientation, with $b_1$ pointing essentially in the down-wind direction, and $b_2$ completing the right-hand coordinate system. The blade coordinate system $\{b_1, b_2, b_3\}$ is fixed to the blade, and rotates with the blade when the blade pitches.

When the wind speed is above zero, the totality of aerodynamic forces on the blade surface produce blade loads, including blade-root moments, about each of the $b_i$ directions (i=1, 2, 3). In particular, a blade load about the $b_1$ axis is herein denoted "an edgewise blade load", a blade load about the $b_2$ axis is herein denoted "a flapwise blade load", and a blade load about the $b_3$ axis is herein denoted "a torsional blade load".

Herein, a "dirty" blade surface condition is defined to mean any change in the blade surface condition from a preselected blade surface condition, the preselected blade being preferably representative of a blade surface condition corresponding to the optimal, or "as designed and intended", blade surface condition. Several types of blade surface changes cause a dirty blade surface condition. A first change is the accumulation of inorganic matter, such as dirt or ice, or organic matter, such as insects, on the surface of the blade, leading to an increase in surface roughness, and accompanying degradation in aerodynamic performance. A second change is the loss of surface mounted aerodynamic appendages, designed to improve the aerodynamic performance of the blade. Examples of aerodynamic appendages include surface mounted vortex generators. A third change is the loss of surface material through a process of surface erosion.

When these surface mounted appendages are removed from the surface, such as due to impact of foreign objects against the blade, the beneficial aerodynamic effect of the appendages is lost. The blade, therefore, remains with an altered surface condition that provides inferior aerodynamic performance in comparison to the original design. This altered surface condition is included in our definition of a "dirty" blade surface.

Furthermore, the use herein of the nomenclature "blade loads" is explicitly meant to cover other equivalent blade quantities related to blade loads, but of different physical units as the normal engineering units for loads, namely, Newtons. Example of other equivalent quantities include blade material strain, measured in percent, blade deflections at selected spanwise locations, measured in meters, and blade-root moments, measured in Newton-meter.

Part 2: System Aerodynamic Maps

At any given instant in time, the blade is subjected to a given operational state. The given operational state is defined by a representative blade angle of attack, $\alpha$, and a "dynamic pressure", Q. These quantities are derived from the air density, estimated wind velocity at rotor, and turbine geometry state (blade rotational speed, pitch angle), as further described below.

For a given blade geometry with a given surface condition, an aerodynamic map, denoted herein with the symbol $\mathcal{M}$, is constructed or created. The aerodynamic map $\mathcal{M}$ consists of an association or relation, either in tabular or functional form, between blade operational states as independent variables, and blade loads as depended variables, the blade loads being derived from the blade deformation signals or measured blade deformations.

There are essentially two ways to build or create aerodynamic maps. The first way uses a mathematical model of the blade to generate the map. The mathematical model is typically solved numerically, and numerical simulations of blade aerodynamics is a process well known in the art. In this process, the effects of blade surface condition (e.g., clean or dirty) can be modeled based on wind tunnel measurements in which well defined surface roughness is used. The main advantage of the mathematical model is knowledge, and control, of the wind field used in the simulation, while the main disadvantage is that the computed blade deformations are subject to modeling approximations, hence may be subject to some inaccuracy.

The second way to build or create the aerodynamic maps uses experimental data to supply measured blade deformations on an actual turbine. The turbine is operated in a special way, so as to generate aerodynamic maps based on directly measured values. One possible procedure to generate the necessary tabular values, as described below, is to let the turbine idle at selected speeds while simultaneously measuring rotor speed and wind speed. An idling turbine is characterized by a rotating rotor with simultaneous minimal electrical power extraction. Due to the minimal power extraction, the rotor's induced velocity is essentially zero, and, hence, the turbine-mounted anemometer provides a true value of the wind speed at the rotor plane (when the anemometer is outside the wake of a passing blade). The rotational speed during idling should be selected to be at least one quarter, and preferably at least one half, of the maximum rotational speed of the turbine below rated wind speed. To impose a desired idling speed, one blade is selected to generate aerodynamic lift force, and is used for measurements, while the remaining blades are pitched so as to provide sufficient drag to equilibrate the rotor at the desired speed. The main advantage of the experimental model is the accuracy of the blade deformation data, while the main disadvantage is the estimation of the wind speed at the rotor plane.

In the interest of brevity, we present the construction of the aerodynamic maps for the preferred embodiment using blade loads as dependent variables, but it is clear to those skilled in the art that the aerodynamic loads can also be constructed using other blade signals indicative of blade loads, such as blade displacements at selected span locations, and material strain at selected blade locations.

The independent and dependent quantities in the aerodynamic maps are derived from raw measurement signals. The raw measurement signals are measured at different wind turbine operating conditions, hence at different instances in time, and herein we denote with the subscript "i" the measured values obtain at one particular instance. The construction of the aerodynamic maps is a five-step process (steps m1-m5), as follows:

Step m1

At each measurement instant "i", the following measurements are made for each blade:
the rotor speed (blade rotational velocity), $\Omega_i$, (rad/sec)
the blade azimuthal angle, $\Psi_i$, (rad)
the blade pitch angle, $\beta_i$, (rad)
the air density $\varrho_i$, (kg/m³)
the measurement of the wind speed at, or near, the wind turbine, $V_i$, (m/s)
which are used to construct the independent variables, and
the blade signals $\{P_i\}$ in the direction $b_1$, and
the blade signals $\{R_i\}$ in the direction $b_2$
and preferably also comprising
the blade signals $\{T_i\}$ in the direction $b_3$
which are used to construct the dependent variables. The blade signals $P_i$, $R_i$, and $T_i$ are indicative of at least blade deformation, and can be blade strains, more preferably blade displacements at selected span locations, and most preferably blade-root moments. As mentioned above, we will restrict the nomenclature to "blade loads", without loss of generality.

Step m2

Removal of the gravity and centripetal component from the blade loads. In a first embodiment, this removal is performed at each measured instance "i". In a second embodiment, the constant component of the blade loads due to gravity and centripetal acceleration is removed at instance "i", and the remaining cyclic components (in the variable $\Psi$) are later removed by averaging the blade loads over one complete rotor revolution.

In the first embodiment, the removal of the blade loads due to gravity and centripetal acceleration is done by first computing, using a mathematical model, blade loads due to solely the action of gravity and rotor rotation, these blade loads herein denoted by the superscript "G", and then subtracting said computed blade loads from the measured value to obtain purified blade loads:

$$\tilde{P}_i = P_i - P_i^G \quad (1)$$

$$\tilde{R}_i = R_i - R_i^G \quad (2)$$

$$\tilde{T}_i = T_i - T_i^G \quad (3)$$

The computation of the blade loads due to gravity and centripetal acceleration is done using the instantaneous wind-turbine geometrical state, described by the rotor rotational speed $\Omega_i$, and the blade azimuthal angle, $\Psi_i$, the blade pitch angle, $\beta_i$, the wind turbine's tilt angle of the shaft, the blade coning angle, and the blade geometry, including the blade mass distribution and blade shape. Preferably, the instantaneous blade shape at instance "i" is used in the computation of $P_i^G$, $R_i^G$, $T_i^G$, In particular, when the blade measuring system provides measurements of blade deflections at selected spanwise locations, the instantaneous blade shape can be estimated from these deflection values. When the blade deflection is not directly measured, the blade deflection can be estimated using a mathematical model wherein the aerodynamic loads are computed from the estimated wind speed, $U_i$ and the measured rotor rotational speed, $\Omega_i$.

In a second embodiment, the constant component of the blade loads due to gravity and centripetal acceleration is removed at each instance "i", and the remaining cyclical components of blade loads that vary with blade azimuthal angle $\Psi_i$ are removed in a second step by averaging the blade loads over one complete rotor revolution. This averaging process is described in section "Step m4", below. The constant components of blade loads are due to main shaft tilt angle, blade coning, and centrifugal forces, but are independent of the blade azimuthal angle, $\Psi_i$. These constant components of the blade loads can be calculated using a mathematical model of the turbine, including the blade geometry and mass distribution, and can be made most accurate by including an estimate of the blade instantaneous blade deformation under load at instance "i". The instantaneous blade deformation can be estimated from measurements of blade deflection at specified spanwise locations, or, alternatively, by means of a mathematical model incorporating a description of the blade structural properties, wherein the aerodynamic loads are computed from the estimated wind speed, $U_i$ and the measured rotor rotational speed, $\Omega_i$.

In a third embodiment, the removal of the variation of blade loads due to gravity and centripetal acceleration is done by conditional sampling of blade loads at a specified blade azimuth angle. Conditional sampling means the steps of monitoring the blade azimuthal angle, and triggering the blade load measurements when the blade azimuth angle is within a narrowly defined interval about the specified blade azimuth angle, (such as a specified blade azimuth angle of zero degrees, and an interval from 359 degrees to 1 degree). Most preferably, the specified blade azimuth angle corresponds to the blade position at which the loads due to gravity are minimal in the blade bending directions, and maximal in the blade axial direction, such as when the blade is vertically positioned. At this position the effect of gravity loads on the blade result in a minimum blade displacement in the flapwise and edgewise directions.

The process of conditional sampling based on blade azimuthal angle enforces that the contribution from gravity to the blade loads is always essentially the same. Accordingly, the process of conditional sampling removes the variation in blade loads due to gravity. Conditional sampling can be extended to include two, or more, azimuthal angle, such as the blade vertical up and the blade vertical down position, thereby taking the sum of blade loads at these two azimuthal angles.

Step m3

A representative blade angle of attack, $\alpha_i$, and "dynamic pressure", $Q_i$, are computed. The representative blade angle of attack is defined as:

$$\alpha_i = \tan^{-1}\left(\frac{U_i}{\Omega_i r}\right) - \beta_i \quad (4)$$

where r is the blade radius, $U_i$ is the estimated wind speed at the rotor plane, defined as positive when the wind impinges onto the rotor plane, and the pitch angle $\beta_i$ is positive towards the full feathered position, in conformity with the standard definition used in the wind-energy industry. The adjective "representative" is used in the nomenclature because the local angle of attack at each spanwise section of the blade varies according to the local wind speed and the local blade twist angle given by the geometry of the blade itself. The value of $\alpha$ given by equation (4) provides a representative angle of attack for the entire blade, incorporating the sum-total effect of all the local angles of attack along the span of the blade. Preferably, the value of the pitch angle in the full feathered position of the blade is either 90°, or a value near 90°.

The value for $U_i$ is rarely measured directly, and must be inferred from other data. Possible sources of information from which $U_i$ can be determined include, for example, a cup-based or ultrasonic anemometer 10 attached to the exterior of the nacelle 20, or ultrasonic anemometers located in front and behind the rotor plane, remote wind-sensing systems (e.g., LIDAR) mounted on the turbine, or blade deformation based units, as described in WO 2011/051194 A1.

The cup-based or ultrasonic anemometer 10 signal, $V_i$, can be used as a close approximation to $U_i$, provided blocking and altering effect, such as the wind blocking by the blades, and flow distortion effects of the nacelle, are accounted for. Typically, the wind turbine manufacturer provides a transfer function that compensates for these blocking and altering effects, whereby the transfer function takes the raw anemometer signal $V_i$ as input and returns an estimate of the wind speed far ahead of the turbine, $U_\infty(V_i)$. One can then estimate the magnitude of the rotor induced velocity, $U_{ind}$, and thereby obtain an estimate of the velocity of the wind at the rotor plane, using the relation $$U_i = U_\infty(V_i) - U_{ind}$$

When the turbine is at maximum aerodynamic efficiency, a good estimate of the induced velocity is ⅓ of the free stream velocity, yielding the estimate $U_i = 0.66\ U_\infty(V_i)$. Simple estimate is taking the induced velocity to be ⅓ of the free-stream velocity.

The "dynamic pressure" is herein defined as the classical dynamic pressure times the third power of the blade radius, r, $$Q_i = \tfrac{1}{2} \varrho_i (\Omega_i^2 r^2 + U_i^2) r^3 \quad (5)$$

and has units of Nm, hence equal to the units of the blade loads when the blade loads are selected to be the blade-root moments, although strict parity of dimensional units with the blade signals is not necessary. For example, the multiplication of the third power of the blade radius can be omitted, to yield units in Pascals rather than Newton-meters.

The combination of representative blade angle of attack, $\alpha$, and dynamic pressure Q define the blade operational state.

Step m4

The purified blade loads are normalized with the "dynamic pressure" and averaged over one rotor revolution to yield the normalized purified blade loads $$M^{edge} = \frac{1}{2\pi}\int_0^{2\pi} \frac{\tilde{P}_i}{Q_i} d\Psi \quad (6)$$

$$M^{flap} = \frac{1}{2\pi}\int_0^{2\pi} \frac{\tilde{R}_i}{Q_i} d\Psi \quad (7)$$

$$M^{tors} = \frac{1}{2\pi}\int_0^{2\pi} \frac{\tilde{T}_i}{Q_i c/r} d\Psi \quad (8)$$

where c is the maximum chord of the blade. The averaging process is introduced for the following reasons.

In contrast to computer simulation, where the wind field is perfectly known and measurable, during actual wind turbine operation the average wind speed at the rotor plane, $U_i$, is typically not measured and needs to be estimated. The wind anemometer 10, of cup-based or ultrasonic type, is a standard device found in essentially all commercial wind turbines, hence is a convenient source of information from which to estimate the average wind speed at the rotor, $U_i$. Unfortunately, the cup-based or ultrasonic anemometer 10 measures wind speed at a single point in space, rather than over the entire rotor swept area, hence its reported value for wind speed does not contain information of the spatial variation of wind speed and wind direction over the rotor swept area. Wind-field-gradient effects such as vertical wind shear, horizontal wind shear, and wind veer are excluded from the anemometer's signal, yet these excluded wind effects do affect the instantaneous angle of attack along the blade.

Due to the fact that the rotor blades rotate within this complex wind field, the variations in angle of attack on the blade due to the wind-field-gradient effects are essentially cyclic in variation with the blade azimuthal angle, $\Psi$. The estimated wind speed at the rotor, $U_j$, then, can be taken to be the signal from the wind anemometer 10 (after industry-standard transfer functions for the anemometer are used, as is well known in the art), provided the blade loads are averaged over one rotor revolution to yield the averaged normalized blade loads. It is understood that the integral operation in the above equations can be replaced by an equivalent discrete sum, if so desired. The averaging process essentially removes the cyclic components of the blade signals due to wind-field gradients, as well as the cyclic components of the moments due to gravity.

Step m5

The aerodynamic maps, $\mathcal{M}$, are constructed or created by associating or relating the blade operational state, comprising the representative blade angle of attack $\alpha$, and the estimated dynamic pressure, Q, as independent variable, with each of the normalized purified blade loads $M^{edge}$ $M^{flap}$, and $M^{tors}$. These associations or relations can be represented in mathematical form as:

$$M^{edge} = M^{edge}(\alpha, Q)$$

$$M^{flap} = M^{flap}(\alpha, Q)$$

$$M^{tors} = M^{tors}(\alpha, Q)$$

The aerodynamic map $\mathcal{M}$ is the union of these associations or relations:

$$\mathcal{M} = \{M^{edge}(\alpha, Q), M^{flap}(\alpha, Q), M^{tors}(\alpha, Q)\} \quad (9)$$

In the following description, we use the notation $\mathcal{M}_c : M^{edge}$ to mean the association or relation $M^{edge}(\alpha, Q)$ of a specific map $\mathcal{M}_c$, with similar notation for $M^{flap}$ and $M^{tors}$. This notation is needed to distinguish between associations or relations given by different maps.

The ensemble of measurements taken at multiple time instants "i" are used to build or create the association or relation. The association or relation can be in functional form, whereby a formula computes the normalized purified blade loads given the blade operational state, described by the representative blade angle of attack $\alpha$, and the estimated dynamic pressure, Q, or it can be in tabular form, where a look-up procedure, preferably using interpolation, generates the normalized purified blade loads given a value of $\alpha$ and Q. In the building or creating the functional form of the association or relation, interpolating formulas, such as polynomial interpolation, or more complex formulas, such as neural nets, can be employed. In the building or creating the tabular form of the association or relation, the range of $\alpha$ and Q of interest is discretized into collection bins, and the normalized purified blade loads that fall in each collection bin are averaged to give a representative normalized purified blade loads for each collection bin.

Part 3: System Calibration

Wind turbines produced commercially are typically configured into wind turbine types, so that all turbines based on a selected turbine type have the same components, geometry, and blades. Turbine types are typically identified by the maximum electrical power, the rotor diameter, and the wind class (e.g., IEC classification) in which the turbines should operate. Herein, we label the "reference turbine" and the "reference blade" as a specific exemplar of a chosen turbine type and blade type, respectively, selected to be a well functioning representative of the turbine type.

System calibration is preferably done when the field turbine has blades with a clean surface condition. To perform system calibration, an aerodynamic map $\mathcal{M}_c$ for the blades in a clean surface condition is built or created. System calibration comprises 3 steps (steps c1-c3):

Step c1

Selection of at least one collection bin, characterized by a selected range of values for the representative blade angle of attack, $\alpha$, the dynamic pressure Q, and the blade-pitch angle, $\beta$. For example the at least one collection bin includes all wind turbine instances in which the representative blade angle of attack, $\alpha$, is in the interval [8.0, 8.5] degrees, the dynamic pressure Q is in the interval [$3.3 \times 10^8$, $3.7 \times 10^8$] Nm, and a blade-pitch angle in the interval [−0.25, 0.25] degrees.

With regards to the selection of the at least one collection bin, we note that, while the system calibration can be performed at any time the wind speed as seen by the blade is above zero (i.e. blade-relative wind speed), the preferred embodiment selects collection bins to be consistent with wind turbine values during normal wind turbine operation, so as to permit a high data collection rate while the wind turbine operates continuously, thus avoiding the need for turbine shut-downs or de-rating or other changes to the wind turbine operational logic, and thereby avoiding wind-turbine energy production losses due to aerodynamic calibration itself.

Additionally, since wind-turbine operation below rated wind speed is characterized by minimal blade-pitch variation, the wind turbine operational logic can be altered to command a zero pitch-angle variation while the turbine is below rated, and while the aerodynamic calibration is being performed. The change of minimum blade-pitch variation to zero blade-pitch variation can still lead to the turbine operating at essentially maximum efficiency while aerodynamic calibration is being performed. Consequently, it is preferable to choose the at least one collection bin to correspond to wind turbine operation below rated speed, and with zero pitch activity.

Step c2

During turbine operation, blade signals are collected at time intervals i and processed according to steps m1, m2, m3, m4, and m5, described above. The representative blade angle of attack $\alpha_i$, dynamic pressure $Q_i$ and pitch angle $\beta_i$ of measurement i are tested to see if they are within the range definition of $\alpha$, Q and $\beta$ of the least one collection bin definition, and if so, the data for this time interval is added to the collection bin (The collection bin values must, of course, be initialized to zero before the start of calibration). At the end of the time period allocated for data collection, the average of all the data in the at least one collection bin is averaged, to produce an average representative blade angle of attack $\overline{\alpha}$, averaged dynamic pressure $\overline{Q}$, averaged pitch angle $\overline{\beta}$, and averaged moments $\overline{M}^{edge}$, $\overline{M}^{flap}$ and $\overline{M}^{tors}$.

Step c3

Given at least one collection bin with non-zero data, aerodynamic calibration coefficients $K_1$ and $K_2$ are computed such that the error $$\epsilon = c_1(\overline{M}^{edge} - f_1)^2 + (\overline{M}^{flap} - f_2)^2 \quad (10)$$

is minimized, where, $$f_1 = K_1 \mathcal{M}_c : M^{edge}(\overline{\alpha}, \overline{Q})$$

$$f_2 = K_2 \mathcal{M}_c : M^{flap}(\overline{\alpha}, \overline{Q})$$

and where $\mathcal{M}_c$ is the aerodynamic map for the reference blade with a clean surface condition. The constant $c_1$ has a pre-selected value, greater than 1, that is comparable to the ratio of max lift to max drag for the blade, but the exact value is otherwise essentially arbitrary. The purpose of $c_1$ is to make the contributions of the first and second terms in (10) of comparable magnitude. The variables $K_1$ and $K_2$ perform a scaling function, correcting for the expected small variations between the blade under consideration and the reference blade. The values of $K_1$ and $K_2$ characterize, and calibrate, each specific wind turbine blade. In the case that the specific turbine blade matches exactly the properties of the reference blade, then $K_1=1$ and $K_2=1$.

Another turbine operational point can be used to check the calibration process. In reference to FIG. 5, the turbine coefficient of performance, $C_p$ as is well known in the art, is shown versus tip speed ratio (horizontal axis) and versus pitch angle, indicated in the figure by two arbitrary selected values $\beta_1$ and $\beta_2$. The left plot in the figure displays the $C_p$ for a clean blade, at a selected wind speed, and the right plot displays $C_p$ for a dirty blade at the same wind speed.

Figure 5:
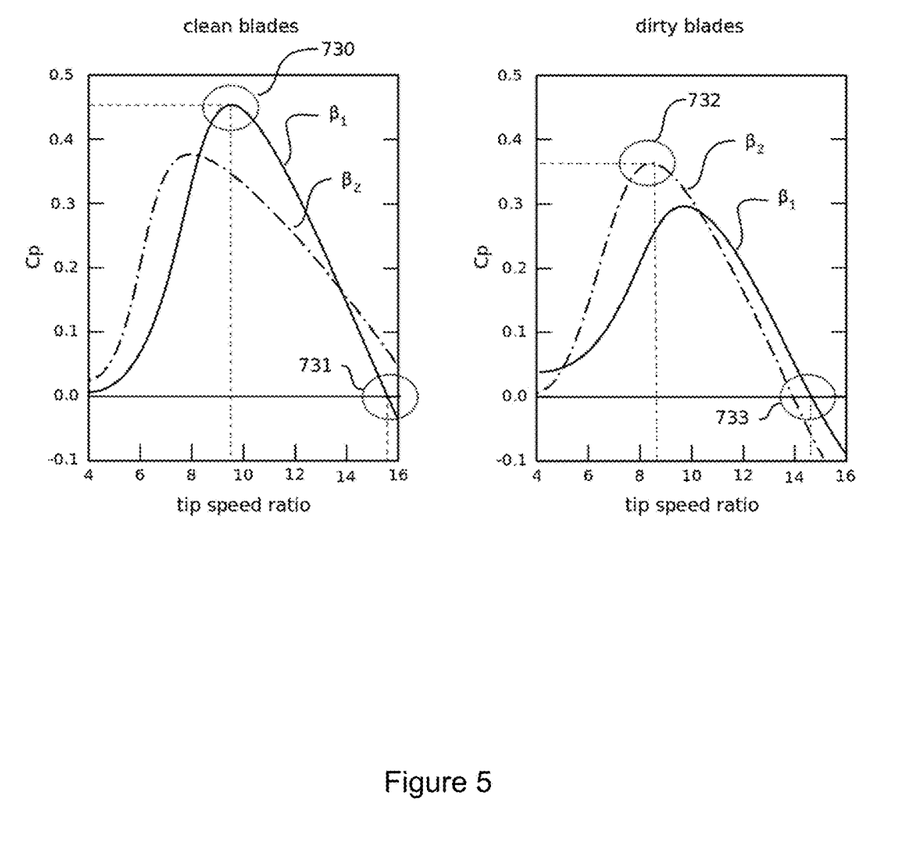

At the point indicated by 730, the coefficient of performance $C_p$ is maximum. Around this point the turbine operates most of the time. At higher tip speed ratios, the coefficient of performance decreases, until reaching a zero value, indicated by 731. This operational point is herein referred to as the free-spin operational point. The free-spin operational point can be reached by letting the turbine spin freely at low wind speeds. In particular, the turbine is operated without any significant amount of torque on the main shaft 41. Zero torque can be approximately achieved by turning off electrical power generation.

The tip-speed ratio at which the zero-crossing 731 occurs depends on the wind speed, and on the surface condition of the blade. For example, crossing point 733 for a dirty blade occurs at a lower tip-speed ration than crossing point 731 for a clean blade. By measuring the wind speed and the rotational speed of the rotor at the free-spin operational point, and by referencing a previously created table associating tip-speed ratios at $C_p$ zero-crossing points to wind speed and blade surface-condition, it is possible to calculate the average surface condition of all blades attached to the hub. This average surface condition measured shortly after the calibration process, should essentially match the average surface condition for clean blades, since calibration is performed under the assumption that the blades are clean.

Part 4: System Operation

For the purpose of the present invention, two aerodynamic maps are generated or created for the reference blade. The first aerodynamic map, denoted $\mathcal{M}_c$, is an aerodynamic map constructed or created when the reference blade has a clean surface condition. This map has already been introduced in the description of calibration, above. The second aerodynamic map, denoted $\mathcal{M}_d$, is an aerodynamic map constructed or created when the reference blade has a rough, or dirty, surface condition. Such predetermined surface roughness can be imposed, for example, by attaching roughness strips or patches on the blade surface to represent expected field conditions. Alternatively, the reference blade used can be an actual blade installed in the field, with the blade having a sufficiently large amount of dirtiness on the surface to well represent the reference blade in "dirty" surface condition.

Figure 3:
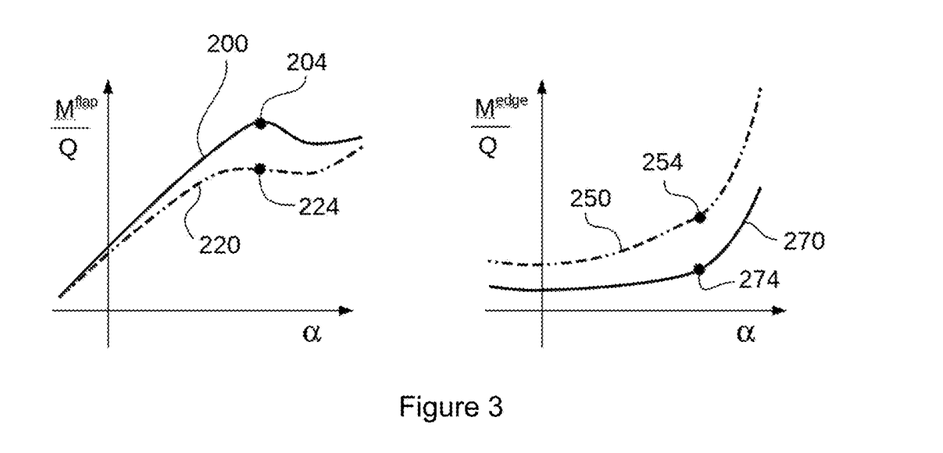

FIG. 3 shows the general trend of the $M^{flap}/Q$ versus the representative blade angle of attack, $\alpha$, for a clean blade, denoted by line 200, and for a dirty blade, shown at line 220. Also shown in the figure is the general trend of the $M^{edge}/Q$ versus the representative blade angle of attack, $\alpha$, for a clean blade, denoted by line 270, and for a dirty blade, shown at line 250. For the same dynamic pressure, Q, and representative angle of attack $\alpha$, the blade with a dirty surface condition generates less lift and more drag. The points 204 and 224 indicate, respectively, the end of the general "attached flow" region and the start of the general "separated flow" region for the clean and dirty blade surface condition. The general "attached flow" region is characterized by air flow over the blade following the contour of the blade surface essentially in its entirety, thereby producing maximum aerodynamic efficiency. The general "separated flow" region is characterized by a significant portion of the blade being in partial or complete stall condition, wherein the air flow ceases to follow the blade surface much before reaching the trailing edge of the airfoil, thereby creating a region of separated flow that leads to loss of aerodynamic efficiency. The word "general" is herein used to make clear that the values of $M^{edge}$ and $M^{flap}$ are indicative of the total lift and drag produced by the entire blade. That is, for an entire wind turbine blade, the contribution of lift force and drag force at each span location are be summed-up to arrive at the total lift and drag generated by the blade. Thus, there could be, conceptually, spanwise location along the blade where a flow separation occurs over a fraction of the span of the blade, and the blade still be operating in the general "attached flow" region of FIG. 3. The representative blade angle of attack $\alpha$ where the general "attached flow" region ends and the general "separated flow" region begins is referred to herein as the representative blade stall angle. The at least one collection bin is most preferably defined for a range of representative blade angle of attack $\alpha$ values that are below the representative blade stall angle, so as to guarantee blade operation in the general "attached flow" region.

Figure 4:
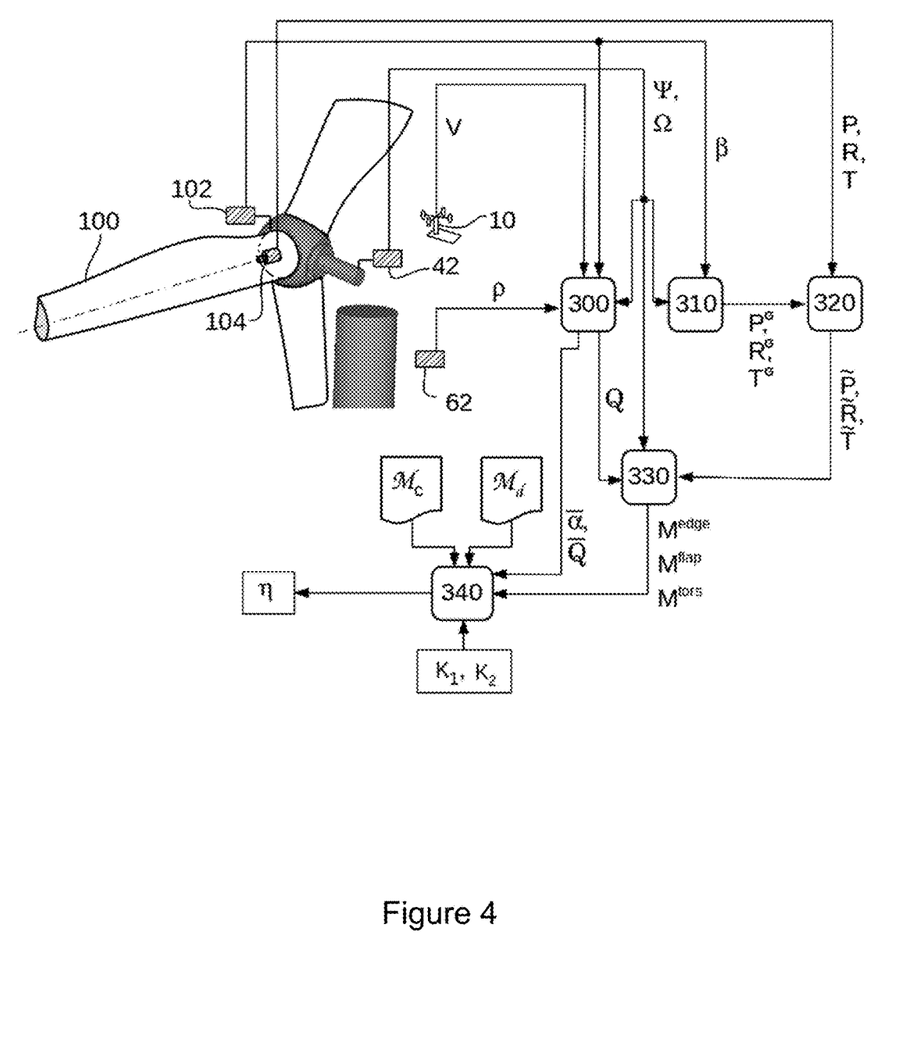

During operation, at sampling time $t=t_i$, the wind anemometer 10 produces a signal $V_i$ (see FIG. 4). Herein, we use the short-hand notation $V_i$ to denote the value of V obtained at time $t=t_i$, hence $V_i=V(t_i)$, with similar notation for other signals. Simultaneously, (e.g., at time $t=t_i$) a rotor encoder 42 produces two signals, one indicative of the instantaneous rotor azimuthal angle $\Psi_i$ (rad), and the other indicative of the rotor rotational speed $\Omega_i$ (rad/s). Also simultaneously, an air density sensor 62 produces a signal indicative of the air density $\varrho_i$, and blade pitch angle measurement unit 102 produces a signal indicative of the blade pitch angle $\beta_i$. The signals indicative of $V_i$, $\beta_i$, $\Psi_i$, $\Omega_i$ and $\varrho_i$ are communicated to first computational unit 300 for computation of the wind speed at the rotor plane, $U_i$, and the associated representative blade angle of attack $\alpha_i$ and dynamic pressure $Q_i$, as per equations (4) and (5). First computational unit 300 further computes the averaged representative blade angle of attack $\overline{\alpha}$ and the averaged dynamic pressure $\overline{Q}$ as the averaged over the last revolution of the corresponding instantaneous values:

$$\overline{\alpha} = \frac{1}{2\pi} \int_{\Psi_i - 2\pi}^{\Psi_i} \alpha_j \, d\Psi \qquad (11)$$

$$\overline{Q} = \frac{1}{2\pi} \int_{\Psi_i - 2\pi}^{\Psi_i} Q_j \, d\Psi \qquad (12)$$

where the notation $\alpha_j$ and $Q_j$ denotes values obtained at previous sampling times $t_j$ during the last revolution, $\Psi(t_i)-2\pi<\Psi(t_j)<\Psi(t_i)$ Simultaneously, at time $t=t_i$, a blade-deformation sensing means 104 measures blade deformations indicative of blade loads and processes these signals to produce signals indicative of the actual blade loads, including actual blade loads $P_i$ about the blade $b_1$ axis, actual blade loads $R_i$ about the blade $b_2$ axis, and, preferably, actual blade loads $T_i$ about the blade $b_3$ axis.

The signals indicative of $\beta_i$, $\Psi_i$, and $\Omega_i$ are further communicated to second computational unit 310 whereat the instantaneous blade loads due to gravity and centripetal acceleration are computed with the aid of a wind-turbine model. Accordingly, the signals $P_i^G$, $R_i^G$, and $T_i^G$, are generated.

Signals $P_i$, $R_i$, $T_i$, and $P_i^G$, $R_i^G$, $T_i^G$ are communicated to third computational unit 320, whereat the actual purified blade loads $\tilde{P}_i$, $\tilde{R}_i$, and $\tilde{T}_i$, are computed by subtracting the gravity and centripetal blade-root moments from the actual blade loads, as per equations (1-3).

Signals representative of the actual purified blade loads, $\tilde{P}_i$, $\tilde{R}_i$, and $\tilde{T}_i$, and a signal indicative of the instantaneous dynamic pressure $Q_i$ are communicated to fourth computational unit 330. The fourth computational unit computes the actual normalized purified blade loads $M^{edge}$, $M^{flap}$, and preferably, $M^{tors}$ using formulas equivalent to (6-8), wherein the averaging is done over the last rotor revolution:

$$M^{edge} = \frac{1}{2\pi} \int_{\Psi_i-2\pi}^{\Psi_i} \frac{\tilde{P}_j}{Q_j} d\Psi \quad (13)$$

$$M^{flap} = \frac{1}{2\pi} \int_{\Psi_i-2\pi}^{\Psi_i} \frac{\tilde{R}_j}{Q_j} d\Psi \quad (14)$$

$$M^{tors} = \frac{1}{2\pi} \int_{\Psi_i-2\pi}^{\Psi_i} \frac{\tilde{T}_j}{Q_j c/r} d\Psi \quad (15)$$

where the notation $\tilde{P}_j$, etc, denotes values obtained at previous sampling times $t_j$ during the last revolution, $\Psi(t_i)-2\pi<\Psi(t_j)<\Psi(t_i)$.

Signals indicative of the blade operational state, as defined by the averaged representative blade angle of attack $\bar{\alpha}$, the averaged dynamic pressure $\bar{Q}$, and signals indicative of the actual normalized purified blade loads, $M^{edge}$, $M^{flap}$, and preferably, $M^{tors}$, are communicated to main computational unit 340. Additionally, the values of the calibrating coefficient $K_1=1$ and $K_2=1$ are made known to the main computational unit 340. For example, the values are written to internal, non volatile memory. Additionally, the aerodynamic map $\mathcal{M}_c$, derived from the reference blade with a clean surface condition, and the aerodynamic map $\mathcal{M}_d$, derived from the reference blade with a fully dirty surface condition, are made known to main computational unit 340. For example, the data are written to internal, non volatile memory.

In the preferred embodiment, the main computational unit 340 checks if the blade operational state, as defined by the averaged representative blade angle of attack $\bar{\alpha}$ and the averaged dynamic pressure $\bar{Q}$, is consistent with the blade operational state used to define the at least one collection bin (i.e. $\bar{\alpha}$ and $\bar{Q}$ are within the range of $\alpha$ and $Q$ that define the at-least one collection bin). If the check is positive, the actual normalized purified blade loads, $M^{edge}$, $M^{flap}$, and preferably, $M^{tors}$, are added to the corresponding values in the at least one collection bin, and an at-least-one-collection-bin counter, N, is incremented by 1. This process of checking and accumulating data in the at least one collection bin continues until the bin counter N surpasses a pre-determined value. Upon N surpassing this pre-determined value, the checking and accumulating process stops, and the actual averaged normalized purified blade loads, $M_a^{edge}$ $M_a^{flap}$, and preferably $M_a^{tors}$ for the at least one collection bin are evaluated by dividing said accumulated values of the actual normalized purified blade loads by said at-least-one-collection-bin counter, N. Main computational unit 340 then proceeds to estimate the blade surface condition. The estimate is produced in a 4 step process (steps p1-p4):

Step p1

An aerodynamic map, $\mathcal{M}_o$, is created, having the property that the map is parameterized by a dirtiness indicator variable $\eta$, using a linear interpolation between clean and dirty aerodynamic maps:

$$\mathcal{M}_o(\eta)=(1-\eta)\mathcal{M}_c+\eta\mathcal{M}_d \quad (16)$$

and where $\eta$ is restricted to values between 0, indicating a clean blade, to 1, indicating a fully dirty blade.

Step p2

An deviatory angle of attack variable, $\Delta\alpha$, is introduced, where the deviatory angle of attack is defined as the deviation in representative blade angle of attack between the actual blade angle of attack, and the representative blade angle of attack $\bar{\alpha}$. A deviation is expected because the value of the induced velocity varies with blade surface condition. Thus, the value of $\Delta\alpha$ is not known a priori, and is calculated by the main computational unit 340;

Step p3

The averaged representative blade angle of attack $\bar{\alpha}$ and the averaged dynamic pressure $\bar{Q}$ define the given operational state of the blade. The main computational unit 340 estimates the surface condition of the blade by comparing the distance of the actual averaged-normalized-purified-blade-loads to the clean-surface normalized-purified blade loads at the given operational state, and the distance of the actual averaged-normalized-purified-blade-loads to the dirty-surface normalized-purified blade loads at the given operational state. In particular, an error function $\varepsilon(\eta,\Delta\alpha)$ is defined to provide a measure of said distance, and the error function is further made dependent on the dirtiness indicator $\eta$ and the deviation of angle of attack $\Delta\alpha$. A possible form for this error function is:

$$\varepsilon=c_1(M_a^{edge}-g_1(\bar{\alpha}+\Delta\alpha,\bar{Q}))^2+(M_a^{flap}-g_2(\bar{\alpha}+\Delta\alpha,\bar{Q}))^2 \quad (17)$$

$$g_1(\gamma,\bar{Q})=K_1[(1-\eta)\mathcal{M}_c:M^{edge}(\gamma,\bar{Q})+\eta\mathcal{M}_d:M^{edge}(\gamma,\bar{Q})] \quad (18)$$

$$g_2(\gamma,\bar{Q})=K_2[(1-\eta)\mathcal{M}_c:M^{flap}(\gamma,\bar{Q})+\eta\mathcal{M}_d:M^{flap}(\gamma,\bar{Q})] \quad (19)$$

where the squared terms $(M_a^{edge}-g_1)^2$, etc, provide a measure of distance, and where the short hand $\gamma=\bar{\alpha}+\Delta\alpha$ is used. The value of the constant $c_1$ is taken to be the same as that used in the calibration process, see equation (10). It is possible to define other functional forms for the error function, provided the functional dependency on $\eta$ and $\Delta\alpha$ is maintained. For example, the torsional blade load components can be included. As a further example, in the case of more than one collection bin, the error is taken over all bins:

$$\varepsilon = \sum_{b=1}^{B} \left\{ \begin{array}{l} c_1((M_a^{edge})_b - g_1(\overline{a}_b + \Delta\alpha, \overline{Q}_b))^2 + \\ ((M_a^{flap})_b - g_2(\overline{a}_b + \Delta\alpha, \overline{Q}_b))^2 \end{array} \right\} \qquad (20)$$

where B is the number of bins, and the subscript b indicates values associated with one particular collection bin.

Step p4

Values for the dirtiness indicator $\eta$ and the deviation of blade angle of attack $\Delta\alpha$ that minimize the error function $\varepsilon$ are computed. The minimizing value for $\eta$ is selected as being indicative of the blade surface condition. A signal indicative of the dirtiness indicator $\eta$ is generated by the main computational unit 340 for further use in the control of the wind turbine, or other aspects of wind turbine operation, including, but not restricted to, optimal maintenance scheduling.

LIST OF REFERENCE NUMERALS

10 a wind anemometer
20 a nacelle
30 a tower
40 a rotational axis
41 a main shaft
42 a rotor encoder
50 a hub
52 a pitch bearing
53 a blade-root plane
55 a blade tip
62 an air density sensor
100 a blade
102 a blade pitch angle measurement unit
104 a blade-deformation sensing means
106 a blade axis
300 a first computational unit
310 a second computational unit
320 a third computational unit
330 a fourth computational unit
340 a main computational unit
$\alpha$ a representative blade angle of attack
$\beta$ a pitch angle
$\eta$ a dirtiness indicator
$\Delta\alpha$ a deviatory angle of attack variable
Q a dynamic pressure
$\mathcal{M}$ an aerodynamic map
$\mathcal{M}_c$ a clean aerodynamic map
$\mathcal{M}_d$ a dirty aerodynamic map
$K_1$ and $K_2$ aerodynamic calibration coefficients
$\in(\eta,\Delta\alpha)$ an error function
$\{b_1,b_2,b_3\}$ a blade-coordinate system
$P_i$, $R_i$, and $T_i$ actual blade loads
$\tilde{P}_i$, $\tilde{R}_i$, and $\tilde{T}_i$ actual purified blade loads
$M^{edge}$, $M^{flap}$, and $M^{tors}$ actual normalized purified blade loads
$M_a^{edge}$, $M_a^{flap}$, and $M_a^{tors}$ actual averaged normalized purified blade loads

The invention claimed is:

1. A method for estimating the surface condition of a blade of a wind turbine rotating about a rotational axis in an air or fluid stream, the method comprising the steps of:
   measuring blade deformations indicative of blade loads acting on the blade to identify actual blade loads (P, R, T),
   measuring blade-state information ($\Psi,\Omega,\varrho$, V) indicative of a blade operational state to identify a given blade operational state ($\alpha$, Q),
   providing a clean-surface aerodynamic map ($\mathcal{M}_c$) relating blade loads to an ensemble of blade operational states when the blade surface is in a clean state,
   providing a dirty-surface aerodynamic map ($\mathcal{M}_d$) relating blade loads to an ensemble of blade operational states when the blade surface is in a dirty state, and
   using a main computational unit forming an electronic subsystem configured to estimate the surface condition of the blade by comparing the distance of the actual blade loads (P, R, T) to the blade loads given by the clean-surface aerodynamic map ($\mathcal{M}_c$) at the given operational state ($\alpha$, Q), and the distance of the actual blade loads (P, R, T) to the blade loads given by the dirty-surface aerodynamic map ($\mathcal{M}_d$) at the given operational state ($\alpha$, Q);
   wherein the contribution from gravity and centripetal acceleration to the actual blade loads (P, R, T) is removed from the actual blade loads (P, R, T) to identify actual purified blade loads ($\tilde{P},\tilde{R},\tilde{T}$); and
   using the estimated surface condition of the blade to at least one of further control operation of the wind turbine or to plan corrective action.

2. The method according to claim 1, wherein the blade-state information comprises a blade azimuthal angle ($\Psi$), a blade rotational velocity ($\Omega$), an air or fluid density ($\varrho$), and an air or fluid velocity (V).

3. The method according to claim 2, wherein the blade-state information further comprises a blade pitch angle ($\beta$).

4. The method according to claim 1, wherein the blade deformations are indicative of blade moments about different blade directions ($b_1$, $b_2$, $b_3$) defined by the blade geometry.

5. The method according to claim 1, wherein the blade geometry defines a blade edgewise direction ($b_1$) and a blade flapwise direction ($b_2$), the blade loads are partitioned into edgewise blade loads (P) acting in or about the blade edgewise direction ($b_1$) and flapwise blade loads (R) acting in or about the blade flapwise direction ($b_2$), and each distance is composed of an edgewise distance involving edgewise blade loads, and a flapwise distance involving flapwise blade loads.

6. The method according to claim 1, wherein the operational state ($\alpha$, Q) is defined by a dynamic pressure (Q) and a representative blade angle of attack ($\alpha$), the dynamic pressure (Q) and the representative blade angle of attack ($\alpha$) being derived from the blade-state information ($\Psi,\Omega,\varrho$ V,$\beta$).

7. The method according to claim 1, wherein the contribution from gravity and centripetal acceleration to the actual blade loads (P, R, T) is computed, and actual purified blade loads ($\tilde{P},\tilde{R},\tilde{T}$) are identified by subtracting this contribution ($P^G,R^G,T^G$) from the actual blade loads (P, R, T).

8. The method according to claim 1, wherein the clean surface aerodynamic map ($\mathcal{M}_c$) and the dirty surface aerodynamic map ($\mathcal{M}_d$) are expressed in terms of purified blade loads, and the surface condition of the blade is estimated on the basis of purified blade loads.

9. The method according to claim 1, wherein the actual purified blade loads ($\tilde{P},\tilde{R},\tilde{T}$) are normalized with the dynamic pressure (Q) to identify actual normalized purified blade loads ($M^{edge}$, $M^{flap}$, $M^{tors}$), the clean surface aerodynamic map ($\mathcal{M}_c$) and the dirty surface aerodynamic map ($\mathcal{M}_d$) are expressed in terms of normalized purified blade loads, and the surface condition of the blade is estimated on the basis of normalized purified blade loads.

10. The method according to claim 1, wherein each said map ($\mathcal{M}_c$, $M_d$) is created by using experimental data or a mathematical model of the blade.

11. The method according to claim 1, wherein each said map ($\mathcal{M}_c$, $\mathcal{M} M_d$) comprises a table or a mathematical function.

12. A blade surface-condition measuring system for a device forming a wind turbine, the device having a blade rotating about a rotational axis in an air or fluid stream, the system comprising:
- a blade-deformation sensing means for measuring blade deformations indicative of blade loads acting on the blade, the blade-deformation sensing means producing signals indicative of actual blade loads (P, R, T),
- a blade-state sensing means for measuring blade-state information ($\Psi, \Omega, \varrho, V$) indicative of a blade operational state, the blade-state sensing means producing blade-state signals indicative of the blade-state information ($\Psi, \Omega, \varrho, V$),
- a first computational unit for identifying a given blade operational state ($\alpha$, Q), the first computational unit receiving the blade-state signals and producing signals indicative of the given blade operational state ($\alpha$, Q),
- a main computational unit for forming an electronic subsystem for electronically estimating a surface condition of the blade, the main computational unit receiving the signals indicative of the actual blade loads (P, R, T) and the given blade operational state ($\alpha$, Q) and further having access to
- a clean-surface aerodynamic map ($\mathcal{M}_c$) relating blade loads to an ensemble of blade operational states when the blade surface is in a clean state, and
- a dirty-surface aerodynamic map ($\mathcal{M}_d$) relating blade loads to an ensemble of blade operational states when the blade surface is in a dirty state,
- the main computational unit further being configured to estimate the surface condition of the blade by comparing the distance of the actual blade loads (P, R, T) to the blade loads given by the clean-surface aerodynamic map ($\mathcal{M}_c$) at the given operational state ($\alpha$, Q), and the distance of the actual blade loads (P, R, T) to the blade loads given by the dirty-surface aerodynamic map ($\mathcal{M}_d$) at the given operational state ($\alpha$, Q),
- the main computational unit producing a signal ($\eta$) indicative of the estimated blade surface condition; and wherein a contribution from gravity and centripetal acceleration to the actual blade loads (P, R, T) is removed from the actual blade loads (P,R,T) to identify actual purified blade loads ($\tilde{P}, \tilde{R}, \tilde{T}$); and
- using the estimated surface condition of the blade to at least one of further control the wind turbine or to plan corrective action.

13. The system according to claim 12, wherein the blade-state information ($\Psi, \Omega, \varrho, V$) comprise a blade azimuthal angle ($\Psi$), a blade rotational velocity ($\Omega$), an air or fluid density ($\varrho$), and an air or fluid velocity (V).

14. The system according to claim 12, wherein the operational state ($\alpha$, Q) is defined by a dynamic pressure (Q) and a representative blade angle of attack ($\alpha$), the signals produced by the first computational unit being indicative of the dynamic pressure (Q) and the representative blade angle of attack ($\alpha$), the system further comprising:
- a second computational unit for computing the contribution from gravity and centripetal acceleration to the actual blade loads (P, R, T),
- a third computational unit for subtracting the contribution ($P^G, R^G, T^G$) of gravity and centripetal acceleration from the actual blade loads (P,R,T) to produce the actual purified blade loads ($\tilde{P}, \tilde{R}, \tilde{T}$),
- a fourth computational unit for producing actual normalized purified blade loads ($M^{edge}, M^{flap}, M^{tors}$ by dividing the actual purified blade loads ($\tilde{P}, \tilde{R}, \tilde{T}$) by the dynamic pressure (Q),
- the main computational unit receiving the actual normalized purified blade loads ($M^{edge}, M^{flap}, M^{tors}$), wherein the clean surface aerodynamic map ($\mathcal{M}_c$) and the dirty surface aerodynamic map ($\mathcal{M}_d$) are expressed in terms of normalized purified blade loads, and the main computational unit estimates the surface condition of the blade based on normalized purified blade loads.

* * * * *